N. MACBETH.
COLOR IDENTIFYING APPARATUS.
APPLICATION FILED DEC. 24, 1919.
1,408,109.
Patented Feb. 28, 1922.
4 SHEETS—SHEET 2.
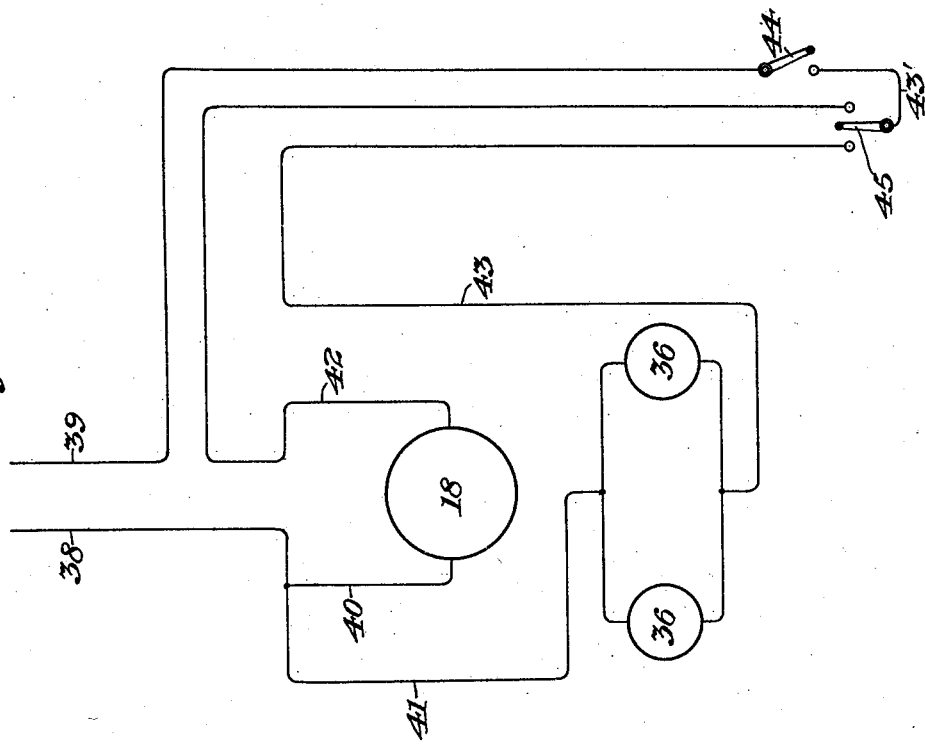
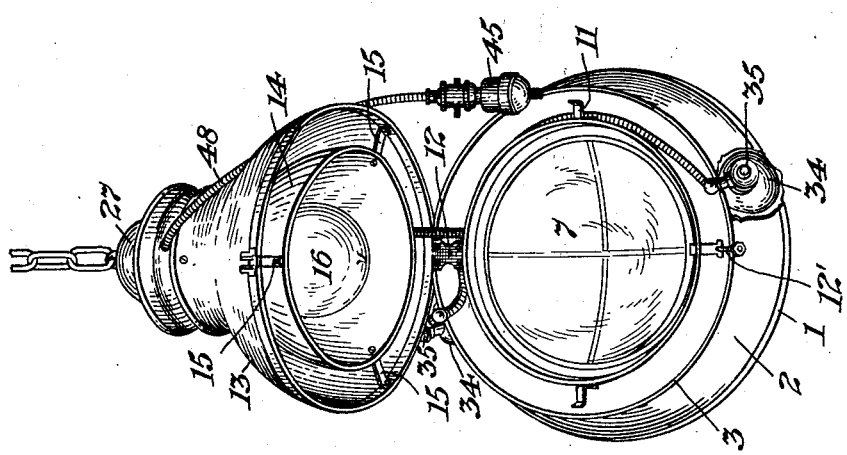
INVENTOR
Norman Macbeth
BY
George P. Scholle
HIS ATTORNEY

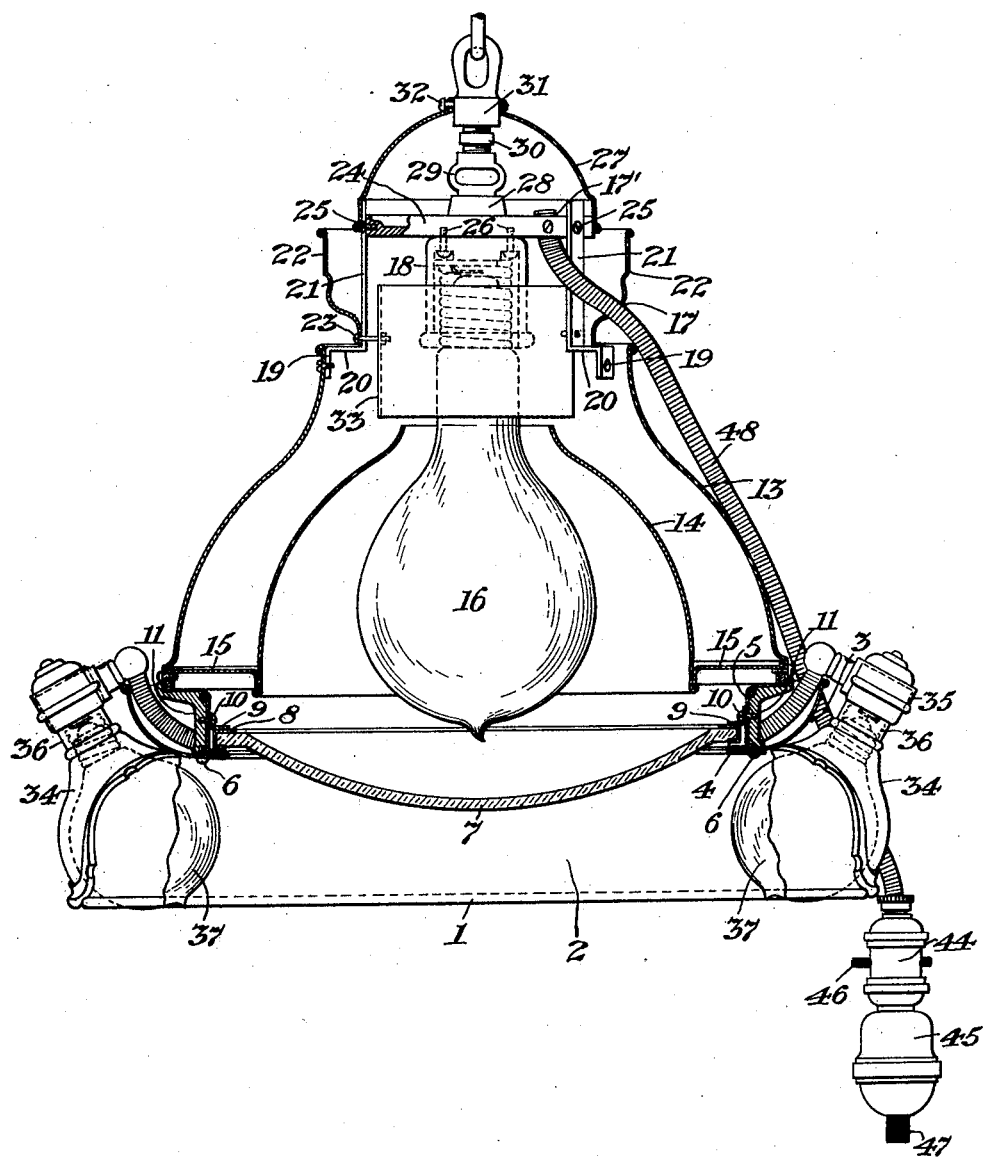

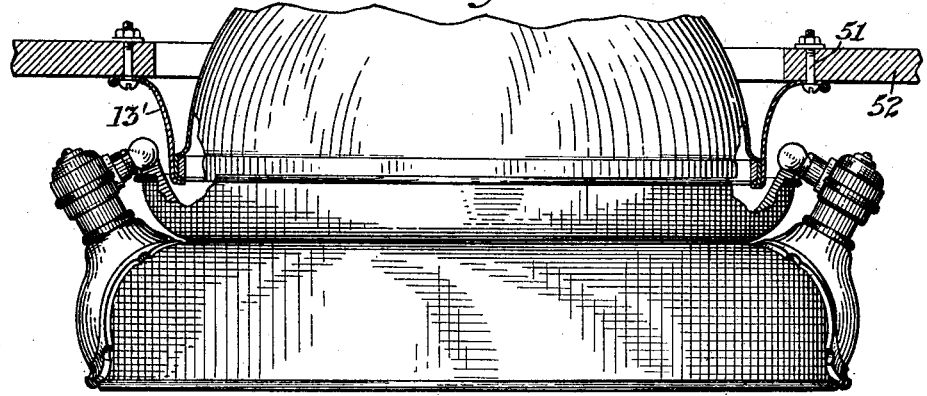
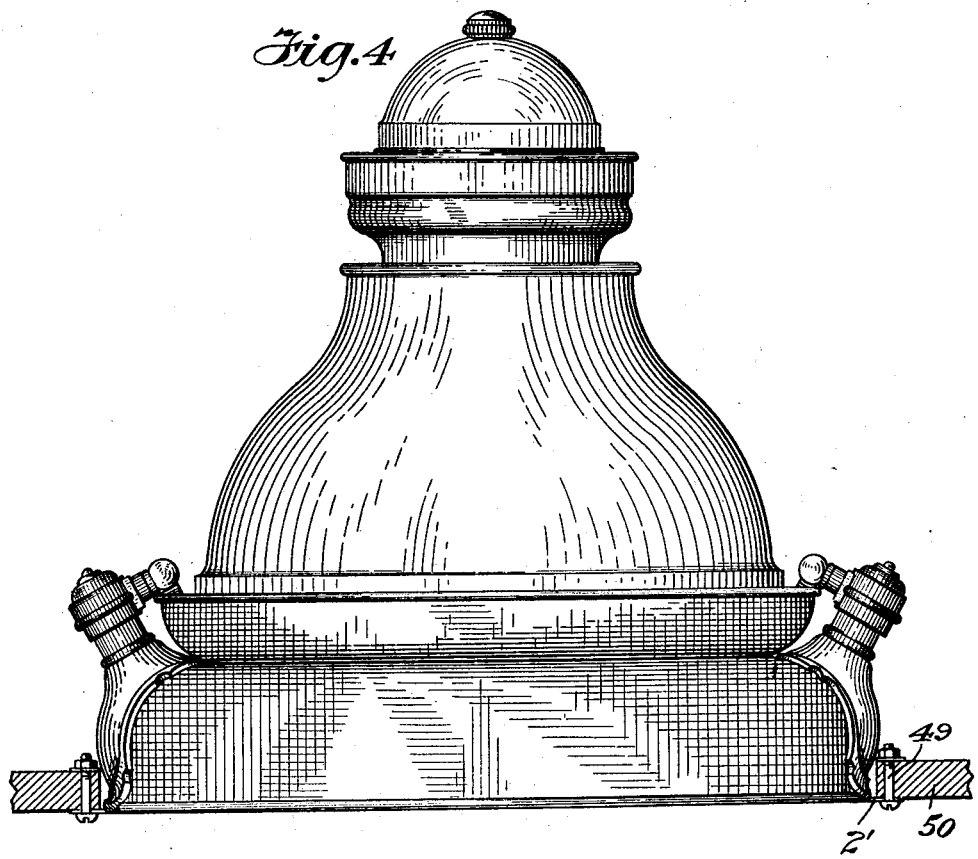

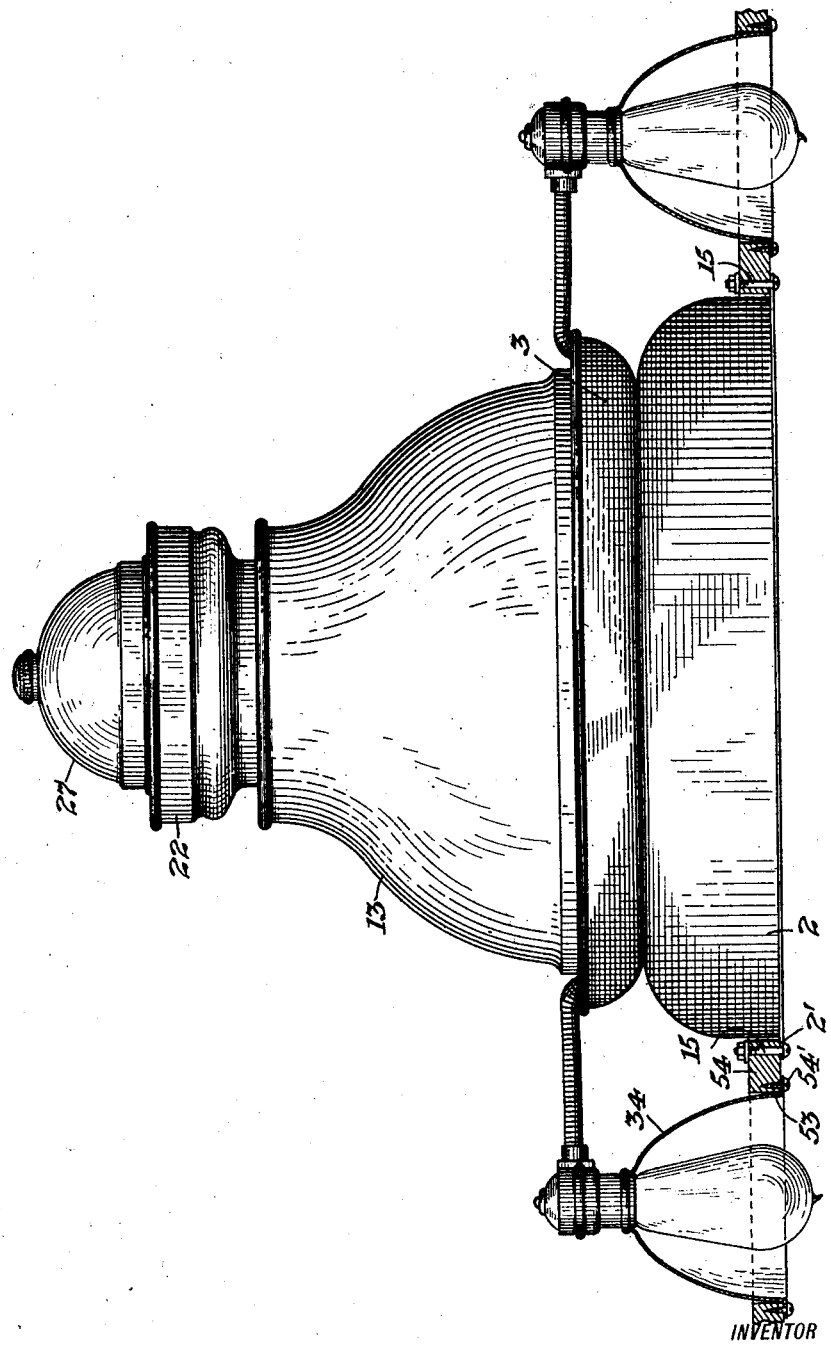

UNITED STATES PATENT OFFICE.

NORMAN MACBETH, OF NEW YORK, N. Y.

COLOR-IDENTIFYING APPARATUS.

1,408,109.   Specification of Letters Patent.   Patented Feb. 28, 1922.

Application filed December 24, 1919. Serial No. 347,171.

*To all whom it may concern:*

Be it known that I, NORMAN MACBETH, a subject of the King of Great Britain, and resident of 227 West 17th St., New York, in the county of New York and State of New York, have invented certain new and useful Improvements in Color-Identifying Apparatus, of which the following is a specification.

My invention concerns an electric illuminating apparatus primarily intended for matching and identifying colors, such as the colors of colored dress goods and the like, by alternately illuminating the same with a source of ordinary artificial light, such as the light given by an ordinary incandescent lamp, and with a light source, the color of which has been corrected so that it furnishes a light equivalent to daylight. My apparatus is primarily intended to carry out the method of procedure for the indentification of colored objects described by me in my U. S. Patent No. 1,239,443 of December 17, 1917.

The object of my invention is to provide an apparatus of rather large capacity and which may be permanently attached to the ceiling of a room or enclosure in which colored objects are to be examined alternately under an ordinary artificial light and under light equivalent to daylight. In particular it is adapted to be permanently attached for example to the deck or ceiling of a three mirror booth such as is used in clothing stores, so that the purchaser of wearing apparel may examine the same alternately under the conditions of artificial light and of daylight, without the necessity of his stepping out of the booth.

Another object of my invention is to so construct my apparatus that it is properly ventilated and that the heat generated therein is uniformly distributed and removed.

A further object of my invention is to provide means for effectively screening one light source from the other and for preventing light, the color value of which has not been corrected, from escaping outside of the apparatus and thus vitiating the results obtained therewith.

A further object of my invention is to construct my apparatus cheaply and compactly, and in such a manner that the individual parts thereof are easily accessible for inspection, cleaning and repair.

My apparatus is illustrated in the accompanying drawings. Fig. 1 of the said drawings represents a vertical cross-section of a preferred form of my apparatus suitable for pendent use. Fig. 2 is a perspective view of my apparatus, the same being open to show the arrangement of the inner parts. Fig. 3 is a wiring diagram, showing a suitable method of making the electrical connections in my apparatus. Fig. 4 shows the modification of my apparatus for use where the same is permanently attached for instance to the ceiling of a three mirror booth above referred to. Fig. 5 is another modification of the same, also adapted for permanent attachment. Fig. 6 is a further modification of the same, intended for the same purpose. Like reference numerals in the various figures indicate like parts.

In the said drawings the numeral 1 represents a sheet metal shell, consisting of a lower inwardly-curved portion 2, an upper outwardly-curved portion 3, and a drawn-in middle portion forming a circular ridge. Supported on the said ridge 4 is a cylindrical ring 5 of sheet metal, the lower rim of which is turned inwardly at right angles. Resting on the lower rim of the said cylindrical ring 5 there is a disc 7 of colored glass, chosen with a view of correcting the color value of the light passing therethrough and rendering the same equivalent to daylight. The said disc 7 is provided on its edge with a sheet metal binding 8 and is held in position by angle clips 9 fastened to the inner surface of the cylindrical ring 5 by screws 10. Fastened to the outside of the cylindrical ring 5 are outwardly-projecting lugs 11, to which the rim portion 4 is fastened by screws 6.

At opposite points on the circumference of the above-mentioned lower portion 2 of the shell 1 are cut two openings, covered by reflector casings 34, 34. Each of the said casings is provided with an upper extension 35, 35, the latter being adapted to receive an incandescent lamp socket of the usual construction 36, 36. Into the sockets 36, 36 there are inserted incandescent lamps 37, 37 of the usual construction, preferably of the refractory filament type.

Upon the above-mentioned lugs 11 there rests a conical shell 13. A reflector 14 is disposed within the said shell 13 and supported from the same by a plurality of inwardly-extending straps 15. Within the reflector 14 there is arranged an incandescent lamp 16, preferably of large candle power and of the so-called gas-filled type. The lamp 16 is held in a porcelain socket 18 of the usual construction.

At the top of the conical shell 13 and on the inside thereof, there are located a plurality of inwardly-extending straps 19, having a horizontal intermediate portion 20, and an upwardly-extending vertical portion 21. Upon the said horizontal portion 20 there rests an outwardly-curved cylindrical shell 22, fastened thereto by screws 23. The upper end of the vertically-extending portion 21 is fastened to a circular plate 24 by means of screws 25. The above-mentioned porcelain lamp socket 18 is also supported from the under side of the said plate 24 by means of the screws 26.

An inverted cup-shaped top shell 27 fits tightly over the circular plate 24, being supported by the upper end portions 21 of the straps 19. The plate 24 is provided on its upper surface with a boss 28, which has a central threaded opening into which screws a male and female threaded hickey 29. Into the upper threaded portion of the hickey 29 there screws a hollow nipple 30, which is also threaded at its upper end. Onto the latter there is screwed a suspension ring 31, over which the above-mentioned top shell 27 is slipped, whereupon it is fastened to the same by the screw 32.

From the above-mentioned screws 23 there is also supported a cylinder 33 of sheet metal, which is interposed between the neck of the incandescent lamp 16 and the shell portions 13 and 22.

As shown in the wiring diagram Fig. 3, the electrical connections within my apparatus are made in the following manner. In case I should desire for example to use the same suspended from an overhead support. The outside line wires 38, 39 pass through the suspension ring 31 and the hollow nipple 30 and are brought out through the sides of the hickey 29. The line wire 38 is then divided into two branches 40, 41, the branch 40 passing to the large lamp socket 18, while the other branch 41 passes to the lamp sockets 36, 36, the lamps 37, 37 being connected in parallel. The return wire 42 from the lamp socket 18 as well as the return wire 43 from the lamp sockets 36, 36 are brought back to the top of plate 24 and then pass through a flexible tube 48, which enters into the upper portion of the structure through an aperture 17 in the shell portion 22 and an aperture 17' in the plate 24. To the end of the said tube 48 are attached a two point or single pole switch 44 of the usual construction, actuated by a push button 46 and a three-point double-pole switch 45 of the usual construction actuated by the push button 47. The wire 42 is connected to one pole of the three-point switch 45, while the wire 43 is connected to the other pole of the same. The common pole of the switch 45 is connected by a wire 43' to one point of the single pole switch 44, and the other point of the same is connected to the second line wire 39, which latter also passes through the flexible tube 48. Thus, when the main circuit has been closed by actuating the two point switch 44 by means of the push button 46, I am enabled to rapidly alternate the incandescent lamp 16, the light of which is corrected so as to furnish light equivalent to daylight, and the ordinary incandescent lamps 37, 37, by operating the three point switch 45 by means of the push button 47.

The arrangement of electrical connections such as I have described above is suitable, when my apparatus is to be used in a pendent position, but it is evident, that I may modify the same in case I should intend to use my apparatus in locations, where the same would be permanently attached to a support in any suitable manner, or where I should find it more advantageous to make the electrical connection in any other suitable manner, provided that I obtain a rapid alternation of the light sources furnishing the different qualities of light.

It will be noted from the above description that I have provided my apparatus with ample space for ventilation inasmuch as a large quantity of air can enter therein through the annular space provided between the upper portion 3 of the bottom shell 1 and the conical shell portion 13. The air thus entering rises in the space between the reflector 14 and the conical shell 13 and partially within the reflector 14. It then passes over the glass disc 7 and around the lamp 16, thus carrying off a considerable amount of the heat generated by the same. The heated air passes out of the top of the apparatus through the annular spaces provided between the shell portions 13 and 22 and the shell portions 22 and 27.

In spite of the large amount of air space thus provided, none of the unfiltered light furnished by the incandescent lamp 16 can escape to the outside of the apparatus, because it is trapped and reflected towards the interior of the apparatus by the cylindrical sheet metal ring 5 mentioned above, the cylindrical sheet metal ring 33 arranged in the upper portion of the apparatus, and the lower edges of the shell portions 27 and 22.

The interior of my apparatus is easily accessible, because the upper portion thereof can be thrown back by means of the hinge 12, Fig. 2, after the lug screw 12', which holds the two sections of the apparatus together, has been loosened.

Fig. 4 shows a modification of my apparatus, when the same is to be used for instance permanently attached to the deck or ceiling of a three mirror booth, such as mentioned above. In this construction the lower portion 2 of the bottom shell 1 is provided with a bottom flange 2' extending outwardly at right angles thereto. It is fastened by means of screws 49 to the wooden deck or ceiling 50 of a booth of that character.

Fig. 5 shows another modification of my apparatus, when the same is also intended to be permanently fastened to a support such as for instance the deck of a three mirror booth. In this construction the apparatus is supported from the shell 13 by means of an outwardly-curved ring portion 13', the lower edge of which is turned in so as to form an offset upon which the said shell portion 13 rests. The outwardly-curved ring 13' is supported from the wooden deck 52 by means of screws 51.

Fig. 6 represents another modification of my apparatus, which I have found suitable in cases where the apparatus is to be permanently attached to a support and where it is desirable to have the light sources spaced somewhat further apart, in order to prevent the formation of too strong shadows upon the goods under examination. The portion 2 of the bottom shell carries an outwardly-extending lower rim 2' which is fastened to the deck or support 54 by screws 51. Instead of being attached to the shell portion 2, the lamp reflectors 34 are spaced a certain distance apart from the main body of the apparatus, and are also provided with an outwardly-extending lower flange 53, by means of which they are fastened to the support 54 by screws 54'.

It is understood that I do not confine myself to the precise construction and arrangement of parts shown in the accompanying drawings, because it is evident that various modifications and changes of form may be made therein without departing from the spirit of my invention.

Having thus described my invention, I claim:

1. An apparatus of the character described comprising a light source giving light equivalent to daylight and a light source giving ordinary artificial light, switching means adapted to connect the said light sources with an electric circuit and to rapidly alternate the same and a casing enclosing the said light sources consisting of a plurality of superimposed sections, the said sections being spaced apart from each other and adapted to permit the access into and escape from the interior of said casing of a large quantity of air for ventilation purposes, but to prevent the escape of light from the same, the said casing being provided with means for downwardly reflecting the light from the said two light sources.

2. An apparatus of the character described comprising a light source giving light equivalent to daylight and a light source giving ordinary artificial light, switching means adapted to connect the said light sources with an electric circuit and to rapidly alternate the same and a casing enclosing the said light sources consisting of a plurality of superimposed sections of successively decreased diameter, the said sections being spaced apart from each other and adapted to permit the access into and escape from the interior of said casing of a large quantity of air for ventilation purposes, but to prevent the escape of light from the same, the said casing being provided with means for downwardly reflecting the light from the said two light sources.

3. An apparatus of the character described comprising a light source giving light equivalent to daylight and a light source giving ordinary artificial light, switching means adapted to connect the said light sources with an electric circuit and to rapidly alternate the same and a casing enclosing the said daylight source consisting of a plurality of superimposed sections, the said sections being spaced apart from each other and adapted to permit the access into and escape from the interior of said casing of a large quantity of air for ventilation purposes, but to prevent the escape of light from the same and means for downwardly reflecting the light from the said two light sources.

4. An apparatus of the character described comprising a light source giving light equivalent to daylight and a light source giving ordinary artificial light, switching means adapted to connect the said light sources with an electric circuit and to rapidly alternate the same and a casing enclosing the said daylight source consisting of a plurality of superimposed sections of successively decreased diameter, the said sections being spaced apart from each other and adapted to permit the access into and escape from the interior of said casing of a large quantity of air for ventilation purposes, but to prevent the escape of light from the same and means for downwardly reflecting the light from the said two light sources.

5. An apparatus of the character described comprising a light source giving light equivalent to daylight and a light source giving ordinary artificial light, switching means adapted to connect the said light sources with an electric circuit and to rapidly alternate the same and a casing enclosing the said light sources consisting of a plurality of superimposed sections of substantially circular cross section, the said sections being spaced apart from each other and adapted to permit the access into and escape from the interior of the said casing of a large quantity of air for ventilation purposes, but to prevent the escape of light from the same and means for downwardly reflecting the light from the said two light sources.

6. An apparatus of the character described comprising a light source giving light equivalent to daylight and a light source giving ordinary artificial light, switching means adapted to connect the said light sources with an electric circuit and to rapidly alternate the same and a casing enclosing the said light sources consisting of a plurality of superimposed sections of substantially circular cross section of successively decreased diameter, the said sections being spaced apart from each other and adapted to permit the access into and escape from the interior of the said casing of a large quantity of air for ventilation purposes, but to prevent the escape of light from the same and means for downwardly reflecting the light from the said two light sources.

Signed at New York city, in the county of New York, and State of New York, this 7th day of November, A. D. 1919.

NORMAN MACBETH.

Witnesses:
H. G. BAILEY,
D. F. GUNDACKER.